March 3, 1936.  W. L. MARSTON  2,032,543
METHOD OF OBTAINING AN ANIMAL OIL FROM CRUDE MIXTURES CONTAINING WATER
Filed Oct. 24, 1932
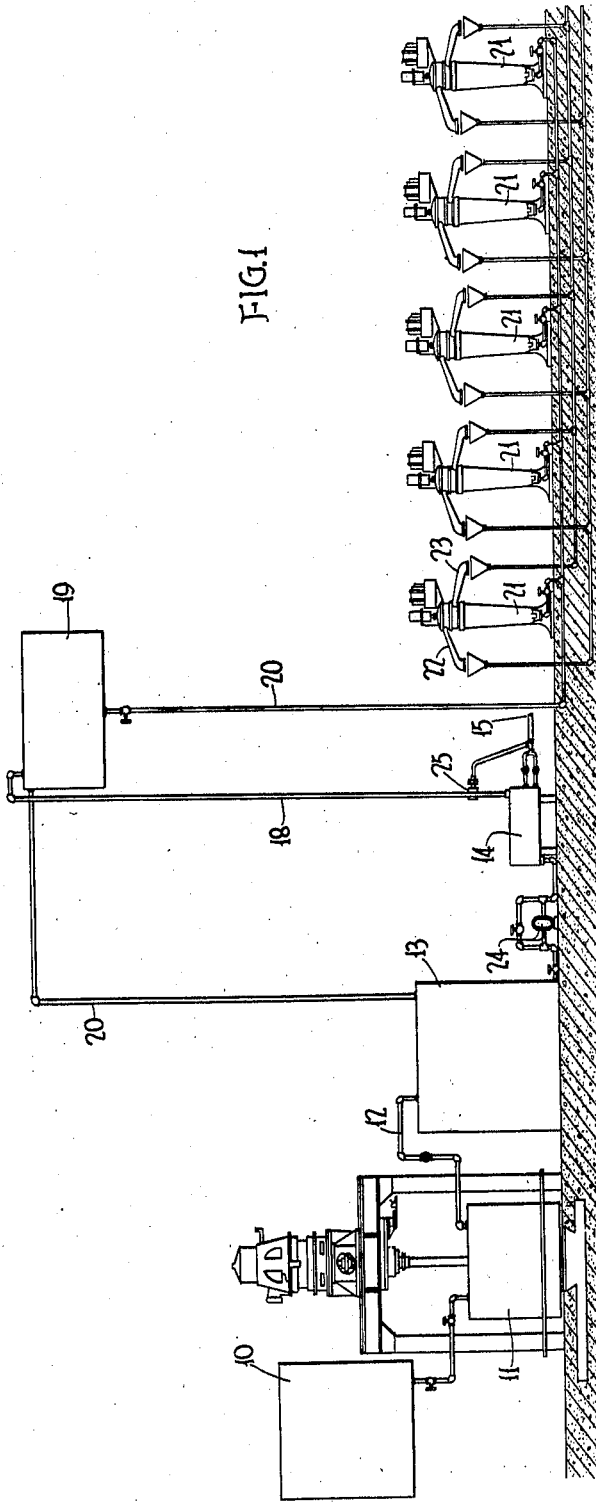
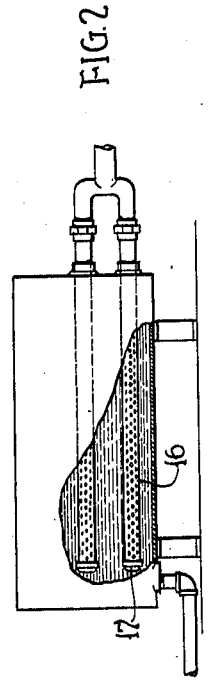
INVENTOR.
WEAVER L. MARSTON.
BY
ATTORNEY.

Patented Mar. 3, 1936

2,032,543

UNITED STATES PATENT OFFICE 2,032,543

METHOD OF OBTAINING AN ANIMAL OIL FROM CRUDE MIXTURES CONTAINING WATER

Weaver L. Marston, Devon, Pa.

Application October 24, 1932, Serial No. 639,274

3 Claims. (Cl. 87—6)

In the extraction of oil from oil bearing substances of animal origin, such as fish, it is common to expel the oil from the solid matter by the application of pressure thereto. This pressure results in the dissemination of finely divided solids in the oil which are not readily removable on a commercial scale by a process of filtration, and the commercial removal of these solids has therefore been commonly performed by a process of gravity settling and successive water washing operations. Liquid impurities, consisting principally of water, have likewise been removed by this same settling operation. This method of procedure is unsatisfactory both because of the waste of valuable oil incident to the inadequate separation afforded by such a treatment and because of the putrefaction which tends to set in during the settling period and thus cause a deterioration in the quality of the oil.

It has heretofore been proposed that the mixture comprising the oil, water and solids be passed promptly to a centrifugal separating operation after its extraction. In this connection, attention is called to the patent to Taylor et al. No. 1,775,740 and the patent to Hiller No. 1,840,715. These patents contain the suggestion that the mixture first be passed to a relatively low speed centrifugal machine of relatively large solid capacity for removing the solid matter from the oil, and thereafter heated and passed to relatively high speed continuously operating centrifugal apparatus to effect the removal of the liquid impurities and the small quantity of remaining solids continuously from the oil.

The suggestions contained in these Hiller and Taylor patents constitute a very valuable contribution to the art of fish oil extraction and purification and it is the object of the present invention to improve upon the practices described and claimed in these patents. In certain phases of operation in accordance with the teachings of the Hiller and Taylor patents difficulty has been encountered in obtaining oil of the desired color, and it has been a principal object of the present invention to devise a process whereby oil of a lighter and hence more desirable color than that produced by these prior art processes could be obtained.

To this end, the present invention involves the application of heat to the oil, prior to the final centrifugal separating operation, in the form of fluid which is directly applied to the oil under treatment. Thus, in the practice of the invention in accordance with its preferred form, live steam is admitted directly into contact with the flowing body of oil prior to its ultimate centrifugation and this steam avoids the deleterious effect upon the color of the oil incident to the application of indirect heat thereto as practiced in the prior art.

A further feature of my invention consists in the removal of substantially all of the steam from the oil either by a process of condensation to water or evaporation from the main body of oil prior to the centrifugal separation which follows the steam treatment. The detailed manner in which I perform the process of my invention will be more evident by reference to the attached drawing, in which Figure 1 is a diagrammatic side elevation of apparatus adapted to perform the process of the invention, and Figure 2 is a side elevation of a heater element constituting a part of the apparatus illustrated in Fig. 1.

Referring to the drawing by reference characters, the numeral 10 indicates a tank from which the expressed mixture of fish oil, solid matter and water is fed to a centrifugal rotor 11 of the type having a large capacity and relatively slow speed of rotation well known in the art. This rotor is of the imperforate type and is adapted to continuously discharge a liquid effluent during the accumulation of solids against the periphery of the bowl wall. The feed to the bowl is periodically discontinued in order that the solids may be removed. As machines of this type are well known in the art, further reference to the details thereof is believed to be unnecessary. Liquid effluent passes continuously from the rotor 11 through the conduit 12 to a tank 13 during the operation of the centrifuge. This liquid is fed from tank 13 by means of a pump 24 into a heater 14. The oil flows continuously through this heater into a conduit 18 from which it is discharged into a tank 19.

The nature of the heating operation performed at 14 constitutes a very important feature of my invention. In this operation the heating medium is introduced into direct contact with the liquid under treatment. This heating medium is preferably steam and is introduced through a conduit 15 into a plurality of parallel pipes 16 which are closed at 17 as indicated in Fig. 2 and are provided with a plurality of perforations through which the heating medium may escape into the body of oil. The flow of heat-imparting medium to the heater is controlled by suitable mechanism 25 which includes a thermostat responsive to the temperature of the liquid passing through the pipe 18.

The tank 19 to which the heated liquid is passed from the heater 14 is preferably open at its top. By retaining it open, the presence of live steam in the system is effectually avoided. The oil and water are next passed to a centrifugal separating system embodying a plurality of high speed continuously operating centrifugal separators 21 arranged in parallel and adapted to separate the oil from the liquid impurities present and thus complete its extraction by separately discharging these effluents from the separators at 22 and 23.

In the use of a vapor phase heating medium such as steam for directly heating the oil-containing mixture, it is important that the heating medium be allowed either to condense or to escape from the liquid prior to the final centrifugal treatment. The admission of live steam into the centrifuge bowls would tend to set up pulsations in these bowls which would otherwise create a turbulent condition precluding the satisfactory separation of the constituents in the bowls. The indirect passage of the oil to the centrifuges affords ample time for sufficient absorption of heat from the vapors by the oil to condense a large part of these vapors and the remainder of the vapors is allowed to escape by passing them to the tank 19 containing an open top. By adopting these expedients I have avoided the difficulties of separation which would be caused by the immediate passage of the oil containing live steam to the centrifuges.

While I have described a specific mode of operation and a specific apparatus by way of example, I wish it to be understood that my invention is not to be limited by the exact details herein described, but that it is to be interpreted in the light of its broad spirit as defined in the attached claims.

What I claim is:

1. The method of obtaining an animal oil of improved color and purity from a crude mixture of such oil with water and finely divided solids, resulting from the extraction of the oil from animal bodies, which comprises the steps of heating the mixture by the direct injection of steam into said mixture, removing part of the applied steam from said mixture prior to subsequent separation for the purpose of preventing turbulence during such subsequent separating operation, promptly passing the liquid substantially steam free heated mixture of oil and water to a separating zone and separating the animal oil from the remaining constituents of the mixture by continuous centrifugal subsidence to obtain a light colored oil.

2. The method of obtaining a fish oil of improved color and purity from a crude mixture of such oil with water and finely divided fish solids, resulting from the extraction of the oil from fish bodies, which comprises the steps of heating the mixture of fish oil and water by the direct injection of live steam into a body of the oil, condensing a substantial portion of the applied steam, permitting the escape of part of the remaining applied steam for the purpose of preventing turbulence in the subsequent separating operation, promptly passing the substantially steam free heated mixture of oil and water to a separation zone and separating the fish oil from the remaining constituents by continuous centrifugal subsidence to obtain a light colored oil.

3. The method of obtaining a fish oil of improved color and purity from a crude mixture of such oil with water and finely divided fish solids, resulting from the extraction of the oil from fish bodies, which comprises the steps of heating the mixture of fish oil, water and solids by the direct injection of live steam into the body thereof, passing the heated mixture resulting from the steam heating operation through an intermediate zone to a separating zone in such a manner as to insure that said mixture will be substantially free of uncondensed steam at the time that it reaches said separating zone and promptly separating the fish oil from the remaining constituents of the mixture by continuous centrifugal subsidence in said separating zone to obtain a light colored oil.

WEAVER L. MARSTON.